United States Patent Office 3,539,484
Patented Nov. 10, 1970

3,539,484
PHENOL-FORMALDEHYDE-UREA RESIN BINDER FOR SOLID PARTICLES
Richard C. Bowman, Sanborn, Edward J. Lang, Grand Island, and Frank S. Grazen, North Tonawanda, N.Y., assignors to Hooker Chemical Corporation, Niagara Falls, N.Y., a corporation of New York
No Drawing. Filed Dec. 29, 1965, Ser. No. 517,423
Int. Cl. C08q 5/18, 37/14, 51/18
U.S. Cl. 260—29.3           12 Claims

ABSTRACT OF THE DISCLOSURE

A resin binder composition is produced by reacting a urea-formaldehyde or a thiourea-formaldehyde with a phenol and formaldehyde in the presence of an alkaline catalyst at a temperature of at least about 100 degrees centigrade to produce a resin binder composition having a total molar proportion of urea and/or thiourea to formaldehyde of about 1:4 to about 1:8 and a water tolerance of at least 50 percent. The resinous composition is useful as a binder for solid particles such as foundry sand, refractory particles and wood particles. A reduced amount of odor-bearing fumes is evolved during the curing of the resin binder composition.

This invention relates to new and useful improvements in the production of resin binders, to the process for applying these binders to discrete, inert solid particles, and to the compositions produced thereby.

Resin binders have been employed heretofore in the preparation of consolidated materials for bonding discrete, inert solid particles such as sand, abrasive grit, wood chips, carbon particles and the like. Foundry molds and cores, for example, are prepared by mixing sand and a suitable resin binder, and thereafter curing the composition to provide a consolidated, foundry mold or core. Wood particles of various types can be similarly employed with resin binders to provide useful consolidated wood compositions. Similarly, abrasive grit and resin binders can be employed to prepare grinding wheels and the like.

A resin binder composition that has proven commercially successful, especially because of the high cure speeds attainable when using the composition, is a binder composition comprising a liquid one-step phenol formaldehyde resin and a urea resin component, such as a urea formaldehyde. Such resin binders have become widely accepted in the foundry industry and are especially desired because of their high cure speeds. However, certain objections have been raised to the odor evolved from the resin binder during its use in the foundry process. Accordingly, it has become important to provide binder compositions that emit less odor on curing.

It is an object of this invention to provide an improved resin binder composition which overcomes disadvantages inherent in previously available binder compositions. Another object of the invention is to provide an improved resin binder capable of producing strong consolidations for applications in the foundry industries and other industries where sand or other discrete, inert solid particles are bonded. A further object of the invention is to provide an improved resin binder having comparatively high strength characteristics, rapid thermosetting properties which provide rapid operating cycles, and which also have a high degree of moisture resistance in the cured state. Still another object of the invention is to provide a resin binder composition with improved chemical structure so that the evolution of lachrymous fumes is reduced during the curing process.

In accordance with this invention, resin binder compositions of improved stability are produced by reacting a urea-formaldehyde or thiourea-formaldehyde composition having a molar ratio of urea and/or thiourea to formaldehyde in the range of 1:2 to 1:5, with a phenol and additional formaldehyde at an elevated temperature in the presence of an alkaline catalyst. Preferably additional urea or thiourea is also reacted into the composition together with the phenol and additional formaldehyde. By following the process of the invention, excellent control is provided over the evolution of obnoxious fumes or odors upon final curing of the resin.

The initial urea-formaldehyde and thiourea-formaldehyde compositions are prepared by processes which ultimately result in the formation of a urea-formaldehyde or thiourea-formaldehyde composition having a molar ratio of urea and/or thiourea to formaldehyde in the range of 1:2 to 1:5. In one such process, the components are mixed in the initial step in the foregoing ratios and are reacted at a temperature in the range of 25 to 200 degrees centigrade, although higher and lower temperatures can be used. The pH of the reaction mixture is regulated in the range of about 3 to 11, with the lower values of pH being used at the lower reaction temperatures and the higher values of pH at the higher reaction temperatures. The reaction is continued for a period of about one to four hours depending on the extent of reaction desired, since from one to about four molecules of formaldehyde can be reacted with each molecule of urea. The completion of the desired reaction is conveniently determined by monitoring the viscosity of the reaction mixture, as well as other control measures. The final products are usually in liquid form, and are conveniently used as such in the instant invention. In a preferred method of forming the initial ureaformaldehyde (or thiourea-formaldehyde) composition, which method ultimately results in a more stable product, the urea and formaldehyde are initially reacted at a molar ratio of urea to formaldehyde in the range of about 1:4 to about 1:6. The pH of the solution is adjusted to the range from about 7 to 10 by the addition of a suitable amount of caustic, and additional urea is added to the reaction mixture in an amount sufficient to alter the ratio of urea to formaldehyde to the range of about 1:2 to about 1:4. The mixture is heated at the reflux temperature, i.e., about 99 to 108 degrees centigrade, for about 0.1 to 1 hour at atmospheric pressure. Higher temperatures, for example, up to 200 degrees centigrade can be employed under superatmospheric pressure. Thereafter, the reaction mixture is cooled and the pH is adjusted to the range of 5 to 6 by the addition of a suitable amount of acidic material, such as acetic acid. Then, the reaction mixture is reheated to a temperature in the range of about 70 to 110 degrees centigrade and held for a period of time from about 0.5 to 2 hours. The resulting urea-formaldehyde composition has a molar ratio of urea to formaldehyde in the range of 1:2 to 1:4. Throughout this specification, disclosures with respect to urea also apply to the alternate use of thiourea.

In the preparation of the compositions of the invention, the phenol, and additional formaldehyde, and in the preferred embodiment of the invention, the additional urea or thiourea, are added to the initial urea-formaldehyde or thiourea-formaldehyde composition together with an alkaline catalyst. The additional formaldehyde is generally employed in the form of an aqueous solution of formaldehyde. Commercially available solutions generally contain about 37 weight percent formaldehyde, but other concentrations are also available. Forms of formaldehyde such as paraform, can also be used. The phenol is used in proportions sufficient to provide a heat-reactive phenolic condensate when the phenol reacts with available formaldehyde. Such a heat-reactive condensate is produced when phenol is present in a molar deficiency with respect to the available formaldehyde, that is, when there is less than a 1:1 molar ratio of phenol to available formaldehyde. Generally the phenol to formaldehyde molar ratio added to the initial urea- or thiourea-formaldehyde composition is in the range of 1:1 to about 0.25:1. Under such conditions, a resinous material having a water tolerance or water solubility of at least about 50 percent is produced, preferably at least about 100 percent. The water tolerance is preferably in the range from about 100 to about 200, and can vary up to about 500 percent. The water solubility or water tolerance of a phenolic condensate is the amount of water, in weight percent, which when added to the resin will cause the resulting mixture to become turbid, as measured by the Smith Turbidimeter. All or part of the phenol used in the compositions of the invention can be replaced with similar phenolic compounds such as cresol, xylenol, cresylic acid, and mixtures thereof.

The additional formaldehyde and the additional urea or thiourea can be employed in the form of the compounds per se, or can be supplied by combinations of the compounds such as urea-formaldehyde or thiourea-formaldehyde concentrates. The additional urea or thiourea or equivalent concentrate is employed in a proportion to provide a molar ratio in the final composition of urea and/or thiourea to formaldehyde to about 1:4 to about 1:8. Preferably, the molar ratio is in the range of about 1:4 to about 1:6. The molar ratio of phenol to urea and/or thiourea in the final composition is generally in the range of 1:0.5 to about 1:1.5, and is preferably in the range of 1:0.6 to about 1:1.3.

Suitable alkaline catalysts for use in the reaction include the hydroxides of sodium, calcium, barium, potassium, lithium, rubidium and cesium. Other suitable alkaline catalysts include ammonia, the monoamines, diamines and triamines, such as diethylamine, ethylene diamine, and triethanolamine, as well as the carbonates, sulfites, bisulfites, sulfates and phosphates of the alkali metals such as sodium carbonate, sodium sulfite, sodium bisulfite, sodium sulfate, and sodium phosphate. The alkaline catalyst is used in a proportion of about 0.5 to 5 weight percent based on the weight of the phenol.

The reaction of the phenol, free from formaldehyde and additional urea or thiourea with the initial urea or thiourea-formaldehyde composition is generally carried out at a temperature in the range from about 60 to about 110 degrees centigrade for a period of time in the range of 1 to 5 hours. In the preferred reaction sequence, the phenol is added to the initial urea- or thiourea-formaldehyde composition first, the aqueous formaldehyde solution next and the urea or thiourea is added last. Then, the reaction mixture is initially maintained at a temperature in the range of about 60 to 95 degrees centigrade for a period of 0.5 to 3 hours. Thereafter, the temperature of the mixture is increased to the reflux temperature, i.e., a temperature of at least about 100 degrees centigrade, generally in the range of about 100 to about 110 degrees centigrade at atmospheric pressure, and held at the reflux temperature for 0.1 to 1 hour, after which the water tolerance of the reaction mixture is determined periodically and the reaction is continued until the water tolerance reaches the desired value. The elevated temperature can be higher, for example, up to about 200 degrees centigrade when superatmospheric pressures up to 200 pounds per square inch are employed. Even higher temperatures can be employed at pressures over 200 pounds per square inch. Thereafter, the reaction mixture can be vacuum dehydrated to remove a portion of the water, and the pH can be adjusted to the range of 6 to 8. The resulting product is an aqueous resin solution, generally containing about 10 to 50 weight percent water, preferably containing about 15 to 30 weight percent water. The product usually also contains minor amounts of unreacted phenol and formaldehyde, generally up to about 10 weight percent of either compound, usually about 5 weight percent of each compound.

Common reagents can be used for accomplishing the pH adjustments in the process of the invention. Thus, suitable reagents for rendering the reaction mixture acidic include acetic acid, especially glacial acetic acid, formic acid, glycolic acid, other weak organic acids. Also suitable are dilute mineral acids, such as dilute hydrochloric acid, dilute sulfuric acid, dilute phosphoric acid and the like. Suitable reagents for rendering the reaction mixtures alkaline include the hydroxides of the alkali metals, such as sodium, potassium, lithium, rubidium, cesium, and the alkaline earth metals such as barium and calcium, as well as the other alkaline compounds disclosed hereinbefore as catalysts.

The novel processes of the invention result in the production of resin binder compositions that have improved chemical structure so that a reduced amount of odor-bearing fumes or material is evolved during the curing of the resin binder composition. Even greater reduction in the amount of odor evolved is achieved by adding suitable masking agents to the final resin binder composition. Suitable masking agents include pine oil, oil of sassafras, furfural alcohol, vanilla extract, and many other commercially available masking agents.

Suitable curing accelerators for use in the invention when employing the resin binder compositions of the invention with inert filler particles, include aqueous solutions of strong mineral acids, such as hydrochloric acid, sulfuric acid, phosphoric acid, nitric, and the like. Organic acids such as maleic acid, toluene sulfonic acid, oxalic acid, fumaric acid, acetic acid, glycolic acid, sulfamic acid, boric acid, citric acid, and the like, are also satisfactory. Other desirable accelerators include the ammonium salts of strong mineral acids and the organic acids, such as ammonium chloride, ammonium nitrate, ammonium sulfate, monoammonium sulfate, monoammonium phosphate, diammonium phosphate, triammonium phosphate, ammonium acetate, ammonium sulfamate, ammonium borate, ammonium citrate, and mixtures thereof. In addition, the ammonium salts can be formed in situ by introducing into the resin components, the compounds capable of forming the ammonium salts. For example, acetic acid and ammonium hydroxide can be added to the mixture of resin and solid inert particles to form ammonium acetate in situ. Other salts, such as ferric chloride, zinc chloride and iron ammonium sulfate can be employed. The accelerator can be used in preparing the compositions of the invention in a solid or in an aqueous solution. Especially preferred for use in solid accelerators is ammonium chloride. Especially preferred for use in liquid accelerators is ammonium nitrate. The proportion of accelerator to the resinous binder composition is generally in the range of about 0.5 to about 30 weight percent, and is preferably in the range of about 1 to about 10 weight percent based on the total resin component solids.

The resin composition and accelerator can be combined with the discrete, inert, solid particles by several procedures. Following is a typical example:

A portion of foundry sand is introduced into a commercial muller or other suitable mixer. The accelerator is added to the sand and mixed for one-half to five minutes. Thereafter, the resin binder composition is added and mixing continues for one-half to five minutes to provide a "wet mixture" suitable for use in subsequent production of foundry cores.

Alternatively, the resin composition can be added to the sand first, followed by the accelerator. The resin binder and accelerator can be premixed prior to introduction to the sand, but this is usually not done because of the slow curing of the resin binder that would occur at room temperature if the mixture could not be utilized in a resonable period of time. If desired, additional urea or thiourea can be added to the accelerator prior to its use in the process. Also other additives can be used in admixture with or in conjunction with the accelerator to alter the properties of the cured consolidated articles. Useful additives also include ammonia; amines, such as dimethyl amine, ethylene diamine, and the like; and inorganic ammonium salts such as ammonium phosphate, and the like.

The proportion of the resin binder, added to the discrete solid particles is generally from about 0.2 to about 5 percent and is preferably from about 0.5 to about 5 percent of resin solids based on the weight of sand. When wood particles or refractory particles are treated, the proportion of resinous binder is generally from about 2 to about 25 percent and is preferably from about 5 to about 25 percent of resin solids based on the weight of the wood particles or refractory particles.

When sand is employed as the discrete solid particles, the resulting wet mix is suitable for foundry use, in the preparation of foundry cores and molds. When employed for these purposes, tack reducing additives such as kerosene or unctuous materials can be added to the wet mix to provide better blowing characteristics in the core blower.

The curing time of the wet mix will depend upon the concentration of the binder, the temperature conditions and the amount of accelerator employed. The temperature of the core box or mold is generally between about 350 to 500 degrees Fahrenheit, but higher or lower temperatures can be employed if desired. The cure time can be as little as about three seconds, and in some instances can range as high as two minutes. The curing time should be sufficient for the core to attain the strength required for it to support its own weight, and to facilitate its removal from the core box without injury. After the core is removed from the core box it is allowed to stand at room temperature. The residual heat in the core causes the binder in the interior of the core to cure and produces complete consolidation of the discrete particles.

The cores produced by the instant novel process have good resistance to deterioration due to high temperatures, high humidity, and frequent handling. In addition, the surfaces of the resulting cores are not adversely affected by conventional core washes.

While the foregoing discussion has referred to the production of sand cores, it is understood to also apply to the production of sand molds and miscellaneous sand products.

When the discrete particles employed in preparing the wet mix are wood chips, flakes or other wood waste particles, or carbon particles, the wet mix may be pressed into boards or other desired shapes, then heated to temperatures of between about three hundred to five hundred degrees Fahrenheit until the resin is set. The resulting consolidated articles have high strength and good water resisting properties.

As discussed above, the water tolerance or water solubility of the one-step phenol formaldehyde resin may be determined using the turbidity of a mixture of the resin with water as the end point. The Smith Turbidimeter, which may be employed in this determination, is comprised of two adjacent enclosed chambers, one containing a source of red light and the other a source of white light. A glass beaker containing a seven gram sample of the resin to be tested is placed above an opening in the top of the chamber through which a vertical beam of red light passes. A horizontal beam of white light from the other chamber is directed through the sample to intersect the vertical beam of red light. Water is then added to the resin sample while agitating the mixture until the turbidity of the mixture is such that the red light beam is no longer visible. The water solubility is then determined in accordance with the following formula:

$$\frac{\text{Milliliters water added} \times 100}{\text{weight of resin sample}} = \text{percent water solubility}$$

The temperature of the water and the resin should be substantially equal during the determination. Small samples of the phenol-formaldehyde reaction mixture are removed periodically as the reaction progresses and are tested in this manner until the water solubility is preferably at least about one hundred percent or more.

The following examples are presented to define the invention more fully without any intention of being limited thereby. All parts and percentages are by weight unless specified otherwise.

EXAMPLE 1

Comparative example

A one-step, water soluble phenol-formaldehyde resin was prepared as follows: One hundred parts of phenol, 150 parts of an aqueous formaldehyde solution (37.5 percent formaldehyde), and one part of sodium hydroxide were admixed and heated to a temperature of 65 to 75 degrees centigrade. Mixing and heating were continued until the resulting resin showed a water tolerance of about 300 percent as determined by the Smith Turbidimeter. The resulting resin was then dehydrated to about sixty-five percent dissolved solids.

Fifteen parts of this phenol formaldehyde resin were admixed with fifteen parts of an aqueous solution of urea formaldehyde composition. The aqueous solution of urea formaldehyde composition contained about 25 percent urea, about 60 percent formaldehyde, and about 15 percent water.

The resulting resin binder was mixed with sand and accelerator as follows. The sand employed was a round grain sand having the following screen analysis:

| | Percent |
|---|---|
| On 40 mesh | 0.2 |
| 70 | 20.4 |
| 100 | 45.0 |
| 140 | 20.0 |
| 200 | 11.0 |
| Through 200 mesh | 3.4 |

One and a half parts of 85 percent aqueous phosphoric acid which had been diluted with 10 parts of water, were mixed with 2000 parts of foundry sand for one minute. Then 30 parts of the resin binder were added to the sand and mixed for three minutes. The resulting wet mix was blown into a core box to form a foundry core. The core was heated for one-half minute at 440 degrees Fahrenheit. The resulting core was found to have good strength. However, during the curing cycle, it was observed that a considerable amount of obnoxious fumes were evolved from the resin binder composition, which irritate the eyes and respiratory system of the foundry worker.

In the following examples, wherin the binder composition is made in accordance with the process of the invention, the binder compositions were employed in the preparation of foundry cores of excellent strength. However, it was observed that much less odor-bearing fumes were evolved from the resin binder compositions during the curing cycle than were experienced in the curing process carried out in Example 1.

EXAMPLE 2

A reaction vessel equipped with a stirrer, thermometer and vertical water condenser was charged with 1270 parts of an aqueous solution of urea formaldehyde composition containing about 25 percent urea, about 60 percent formaldehyde and about 15 percent water. The pH was adjusted to 9.6 by addition of 1 part of caustic, and 200 parts urea was added to the vessel. Mixture was heated rapidly to reflux and held there for 15 minutes. The solution was then cooled to 50 degrees centigrade and the pH was adjusted to the range of 5.1–5.8 by the addition of 1.7 parts glacial acetic acid. The solution was then reheated to 80–85 degrees centigrade and held there for 45 minutes. A second charge of 15 parts caustic was immediately added and the material was cooled to 60–65 degrees centigrade. 1000 parts phenol, 1420 parts of 37.2% aqueous formaldehyde solution and 720 parts of the aforesaid aqueous urea formaldehyde solution were then charged and the material was reheated to 75–80 regrees centigrade, and held there for 1.5 hours. The temperature was then quickly elevated to reflux (100–108 degrees centigrade) and held for 15 minutes, then quickly cooled to 70 degrees centigrade. The water tolerance was checked, and when it reached 135 percent, the temperature was dropped to 45–60 degrees centigrade and the material was vacuum dehydrated to a refractive index of $N_D$ 1.5290. The pH was then adjusted to 7.15 by the addition of 11 parts glacial acetic acid while cooling. 2 parts of pine oil was blended into the final resin which had the following additional properties: 165 degrees centigrade hot plate cure of 41–46 seconds; viscosity of 1350 centipoises; specific gravity of 1.301; water tolerance of 118%; refractive index of $N_D$ 1.5315; free formaldehyde content of 9.4%; solids content of 72.1% by ASTM D–115–55; and nitrogen content of 7.42%.

908 parts of foundry sand were charged to a muller. Then 18.16 parts of the foregoing resin binder compositions were premixed with 3.63 parts of an accelerator mixture comprised of 21.0 percent ammonium nitrate accelerator, 38.9 percent urea, 1.3 percent ammonium hydroxide and 38.9 percent water. The resulting mixture was charged to the muller and mulled with the sand for 3 minutes. The resulting wet mix was dumped from the muller and blown at a pressure of 90 to 100 pounds per square inch gage into a pattern which was at 425 degrees Fahrenheit. Molded specimens were prepared by holding the wet mix in the hot pattern for increments of time ranging from 5 to 6 seconds. After a 30 minute cooling period, the tensile strength of the specimens was determined in a Dietert Tensile Tester. The tensile strengths of the specimens are shown in Table I.

The resin binder compositions of Examples 1 and 2 were mixed with foundry sand and accelerator in a proportion of about 2 weight percent resin on the sand. The resulting wet mixes were molded into test specimens and cured at 425 degrees Fahrenheit for 20 seconds. The formaldehyde evolution rate was measured for a series of test specimens for each binder composition and found to be as follows:

| Time, seconds | Total percent formaldehyde evolved based on weight of resin | |
| --- | --- | --- |
|  | Example 1 (a) | Example 2 (b) |
| 15 | 0.39 | 0.10 |
| 30 | 0.62 | 0.16 |
| 45 | 0.82 | 0.20 |
| 60 | 0.96 | 0.25 |
| 75 | 1.14 | 0.29 |
| 90 | 1.25 | 0.32 |
| 105 | 1.34 | 0.33 |
| 120 | 1.41 | 0.34 | the following accelerator mixtures were used in the foregoing tests.

(a) a liquid accelerator mixture comprised of 11.9 percent ammonium chloride, 43.0 percent urea, 43.8 percent water and 1.3 percent ammonium hydroxide.

(b) a liquid accelerator mixture comprised of 21.0 percent ammonium nitrate accelerator, 38.9 percent urea, 38.8 percent water and 1.3 percent ammonium hydroxides.

All accelerator mixtures were employed in about 20 percent proportions based on the weight of the resin binder.

EXAMPLE 3

Using the same equipment described in Example 2, 1270 parts of an aqueous solution of urea formaldehyde composition containing about 25 percent urea, about 60 parts formaldehyde and about 15 percent water were mixed with one part caustic and 200 parts of urea (pH of solution of 9.7) and rapidly heated to reflux temperature and held there for 30 minutes. The solution was then cooled to 50 degrees centigrade, and the pH was adjusted to 5.4 by the addition of 1.7 parts of glacial acetic acid. The material was then heated to 80–85 degrees centigrade and held there for 30 minutes. The second caustic addition of 15 parts was immediately charged, and the solution was cooled to 60–65 degrees centigrade. Then 1000 parts phenol, 2580 parts of 37.2% aqueous formaldehyde and 140 parts urea were charged to the vessel, and the temperature was elevated to 75–80 degrees centigrade. After holding at 75–80 degrees for 1.25 hours, the temperature was rapidly increased to reflux temperature (100–108 degrees) and held there for 12 minutes. Solution was immediately cooled to 70 degrees centigrade, and checked for water tolerance. When the water tolerance fell to 182 percent, the material was cooled to 45–60 degrees and vacuum dehydrated to a refractive index of $N_D$ 1.5250. While cooling, the pH was adjusted to 6.85 by addition of 15 parts glacial acetic acid and 2 parts oil of sassafras was blended in. The resin so produced had the following porperties: 165 degrees centigrade hot plate cure of 58–63 seconds; viscosity of 840 centipoises; specific gravity of 1.297; water tolerance of 153%; free formaldehyde content of 5.2%, solids content of 72.2% by ASTM D–115–55, and nitrogen content of 8.25%.

(A) 908 parts of foundry sand were charged to a muller. Then 3.63 parts of the accelerator mixture of Example 2 were added to the sand in the muller and mulled for one minute. Next 18.16 parts of the foregoing resin binder were added to the sand and mulled for 3 minutes. The resulting wet mix was dumped from the muller and blown at a pressure of 80 to 90 pounds per square inch gage into a pattern which was at 425 degrees Fahrenheit. Molded specimens were prepared and tested according to the procedure of Example 2. The tensile strengths of the specimens are shown in Table I, under column 3A.

(B) 908 parts of foundry sand were charged to a muller. Thereafter, the following three components were added to the sand in the muller in succession and mulled for the indicated times: 1.82 parts of water for one minute, 2.27 parts of an accelerator mixture comprised of 36.4 percent ammonium chloride accelerator, 60.7 percent urea and 2.9 percent of calcium magnesium silicate for 2 minutes, and 18.16 parts of the foregoing resin binder for 3 minutes. Then the resulting wet mixture was dumped from the muller and blown at a pressure of 80 to 90 pounds per square inch gage into a pattern which was at 425 degrees Fahrenheit. Molded specimens were prepared and tested according to the procedure of Example 2. The tensile strengths are shown in Table I under column 3B.

EXAMPLE 4

Using the same equipment described in Example 2, a charge of 127 parts of urea-formaldehyde concentrate of Example 3, 0.1 part caustic and 18.8 parts urea with a resultant pH in the range of 8–10 was heated to reflux temperature and held there for 15 minutes. The material was then cooled to 50 degrees centigrade and the pH was adjusted to the range of 5.1–5.8 by addition of 0.17 part glacial acetic acid. The solution was reheated to 80–85 degrees centigrade, and held there for 45 minutes. The second charge of 1.5 parts caustic was immediately added and the material was cooled to 60–65 degrees centigrade. 100 parts phenol and 258 parts of 37.2% aqueous formaldehyde were then added and the material was reheated to 75–80 degrees and held there for 1.5 hrs. Temperature was quickly elevated to reflux and held there for 15 minutes. The solution was rapidly cooled to 70 degrees centigrade. When water tolerance fell to about 150%, the temperature was dropped to 45–60 degrees centigrade, and resin was vacuum dehydrated to a refractive index $N_D$ of 1.5345. While cooling, the pH was adjusted to 6.4 by the addition of 1.1 parts glacial acetic acid. 0.8 part of pine oil was blended in and a resin with the following properties resulted: 165° C. hot plate cure of 55–60 seconds; free formaldehyde content of 7.4%; specific gravity of 1.299; viscosity of 1420 centipoises; ASTM solids content of 71.8%; water tolerance of 155%; refractive index of $N_D$ 1.5325; and nitrogen content of 6.86%.

908 parts of foundry sand was charged to a muller. Then 18.16 parts of the foregoing resin binder composition were premixed with 3.63 parts of an accelerator mixture comprised of 11.9 percent ammonium chloride accelerator, 43.0 percent urea, 43.8 percent water and 1.3 percent ammonium hydroxide. The mixture was added to the sand in the muller and mulled for 3 minutes. The resulting wet mixture was dumped from the muller and blown with air pressure into a pattern which was at 425 degrees Fahrenheit. Molded specimens were prepared and tested in accordance with the method of Example 2. The tensile strengths of the specimens are shown in Table I.

EXAMPLE 5

Similar equipment described in Example 2 was charged with 1125 parts of the urea-formaldehyde concentrate of Example 3. The pH was adjusted to 5.6 by addition of 0.3 part glacial acetic acid and the material was heated to 80–85 degrees centigrade. After maintaining the 80–85 temperature for 30 minutes, a charge of 15 parts caustic was added to the vessel and the solution was cooled to 60 degrees centigrade. Then 1000 parts phenol, 1750 parts 37.2% aqueous formaldehyde solution and 150 parts urea were added to the vessel, and the temperature was elevated to 75–80 degrees centigrade where it was held for 1.25 hours. The temperature was then rapidly raised to reflux and held there for 12 minutes. The resulting product was then cooled to 50 degrees and had a water tolerance of 200 percent. The resin was then vacuum dehydrated to refractive index $N_D$ 1.5285. While cooling the product, the pH was adjusted to 6.8 by addition of 12 parts glacial acetic acid. 5.8 parts oil of sassafras was blended in producing a resin with the following properties: 165° C. hot plate cure of 48–53 seconds, viscosity of 580 cps., specific gravity of 1.277; water solubility of 182%; free formaldehyde content of 5.4%, ASTM solids content of 68.6% and nitrogen content of 7.16%.

(A) The thus prepared resin binder composition was mixed with sand and molded into specimens using the same accelerator mixture, the same proportions and the same mulling and molding procedures of Example 2. The tensile strengths of the resulting specimens are shown in Table I under column 5A.

(B) The foregoing resin binder composition was also mixed with foundry sand and molded into specimens using the same accelerator mixture, the same proportions and the same mulling and molding procedures of Example 3, part B. The tensile strengths of the resulting specimens are shown in Table I, under column 5B.

EXAMPLE 6

The results obtained in Examples 2 to 5 are also obtained using the same procedures, but wherein urea is replaced with thiourea.

TABLE I

| Example Number | 2 | 3A | 3B | 4 | 5A | 5B |
|---|---|---|---|---|---|---|
| Time (seconds) | Tensile strength (pounds per square inch) | | | | | |
| 5 | 90 | 87 | 112 | ---- | 65 | 35 |
| 10 | 217 | 270 | 230 | 438 | 233 | 245 |
| 20 | 427 | 540 | 455 | 530 | 503 | 395 |
| 30 | 590 | 601 | 593 | 527 | 535 | 430 |
| 60 | 592 | 589 | 617 | 554 | 550 | 503 |

In the foregoing Examples 2 to 5, the foundry sand employed had the following screen analysis:

| Mesh size— | Percent sand retained |
|---|---|
| 12 | Trace |
| 20 | 0.10 |
| 30 | 0.23 |
| 40 | 4.61 |
| 50 | 35.90 |
| 70 | 49.00 |
| 100 | 9.89 |
| 140 | 0.10 |
| 200 | Trace |
| 270 | None |
| Through 270 | Trace |

The calculated American Foundry Society fineness number is 47.

EXAMPLE 7

The resin binder composition of the invention was used to prepare crucible moldings as follows: 2080 parts of a silicon-carbide refractory were charged into a mixer, followed by addition of 52 parts of the powdered accelerator mixture used in Example 3, part B. The mixture was agitated until it was homogeneous. Then 468 parts of the resin binder of Example 3 was added to the mixer and mixing was continued until a substantially homogeneous wet mixture was obtained. The wet mixture was dumped from the mixer and placed in molds. The wet mixture in the molds was pressed at 1000 pounds per square inch force, and aged for several hours, and then heated up to 260 degrees centigrade to produce the cured, molded crucible specimens.

Excellent results are also obtained using the procedure of Example 7, but replacing the silicon carbide refractory with other carbon products such as graphite, as well as other refractory materials such as alumina, silica and the like. Curing temperatures are 300 to 500° F.

EXAMPLE 8

Consolidated wood articles, such as composition board, are prepared as follows: 100 parts of wood flake are placed in a horizontal rotating drum. Then 8 parts of the resin binder composition prepared in Example 2 and 1.6 parts of the accelerator mixture employed in Example 2 are mixed and sprayed onto the wood flakes while the drum was rotated at a speed of about ten revolutions per minute. A period of about 8 minutes was required to spray the resin solution on the wood flakes. A wooden frame with an opening of about twenty-four inches by twenty-four inches and a height of about eight inches was placed on a steel caul and a sufficient amount of the coated wood flakes were sprinkled on the caul to substantially fill the frame. Another steel caul was placed on top of the flakes and placed in a hot press. The press was closed to stops producing a board having a density of forty pounds per cubic foot. The temperature in the press was above 325 degrees Fahrenheit, and the board was retained in the press for a period of eleven minutes. The maximum internal temperature of the board was about 230 degrees Fahrenheit. The board on removal from the press had an excellent appearance.

Various modifications can be made in the invention without departing from the spirit thereof. Therefore, the foregoing specification is intended to illustrate the invention but not to limit it.

We claim:

1. A process for producing an aqueous resin binder composition which comprises reacting an urea composition selected from the group consisting of an urea-formaldehyde reaction product, a thiourea-formaldehyde reaction product and mixtures thereof having a molar ratio of urea and/or thiourea to formaldehyde in the range of about 1:2 to about 1:5 and which has been prepared by reacting an urea-formaldehyde, thiourea-formaldehyde or mixtures thereof having a molar ratio of urea and/or thiourea to formaldehyde of about 1:4 to about 1:6 with sufficient urea and/or thiourea to alter the ratio to said range of about 1:2 to about 1:5 at a pH in the range of about 5–6 at a temperature of at least 70 degrees centigrade, with a phenol and formaldehyde in the presence of about .5 to 5 weight percent based on the weight of the phenol of an alkaline catalyst at a temperture of at least about 100 degrees centigrade for up to one hour of the total reaction time and adjusting the pH of the resulting product with an acid to provide a stable resin binder composition, said phenol and added formaldehyde employed in a molar ratio in the range of about 0.25:1 to 1:1 to produce a resin binder composition having a total molar ratio of urea to formaldehyde of about 1:4 to about 1:8 and a water tolerance of at least 50 percent.

2. A process for producing an aqueous resin binder composition which comprises reacting a urea composition selected from the group consisting of an urea-formaldehyde reaction product, a thiourea-formaldehyde reaction product and mixtures thereof having a molar ratio of urea and/or thiourea to formaldehyde in the range of about 1:2 to about 1:5 and which has been prepared by reacting a urea-formaldehyde, thiourea-formaldehyde or mixtures thereof having a molar ratio of urea and/or thiourea to formaldehyde of about 1:4 to about 1:6 with sufficient urea and/or thiourea to alter the ratio to said range of about 1:2 to about 1:5 at a pH in the range of about 5 to 6 at a temperature of at least 70 degrees centigrade, with a phenol, formaldehyde and a urea compound selected from the group consisting of urea, thiourea, and mixtures thereof, in the presence of about .5–5 weight percent based on the weight of the phenol of an alkaline catalyst, at a temperature of at least about 100 degrees centigrade for up to one hour of the total reaction time and adjusting the pH of the resulting product with an acid to provide a stable resin binder composition, said urea compound employed in a proportion to provide a total molar ratio of urea and/or thiourea to formaldehyde of about 1:4 to about 1:8, in the resin binder composition, said phenol employed in a proportion to provide a total molar ratio of phenol to urea and/or thiourea in the range of about 1:0.5 to about 1:1.5 in the resin binder composition, which has a water tolerance of at least about 50 percent.

3. The process of claim 1 wherein said urea composition is urea-formaldehyde.

4. The process of claim 2 wherein said urea composition is urea-formaldehyde and said urea compound is urea.

5. A process for producing an aqueous resin binder composition which comprises first reacting an urea-formaldehyde reaction product having a molar ratio of urea to formaldehyde of about 1:4 to about 1:6 with sufficient urea to alter the urea to formaldehyde ratio to about 1:2 to about 1:4, at a pH of about 7 to 10 and a temperature of at least about 99 degrees centigrade; and thereafter continuing the reaction at a pH in the range of about 5 to 6 at a temperature of at least 70 degrees centigrade; followed by reacting the resulting reaction product with a phenol and formaldehyde in the presence of about .5–5 weight percent based on the weight of the phenol of an alkaline catalyst at a temperature of at least about 100 degrees centigrade for up to one hour of the total reaction time and adjusting the pH of the resulting product with an acid to provide a stable resin binder composition, said phenol and added formaldehyde employed in a molar ratio in the range of about 0.25:1 to 1:1 to produce a resin binder composition having a total molar ratio of urea to formaldehyde of about 1:4 to about 1:8 and a water tolerance of at least 50 percent.

6. A process for producing an aqueous resin binder composition which comprises first reacting a urea-formaldehyde reaction product having a molar ratio of urea to formaldehyde of about 1:4 to about 1:6 with sufficient urea to alter the urea to formaldehyde ratio to about 1:2 to about 1:4, at a pH of about 7 to 10 and a temperature of at least about 99 degrees centigrade; and thereafter continuing the reaction at a pH in the range of about 5 to 6 at a temperature of at least 70 degrees centigrade; followed by reacting the resulting reaction product with a phenol, formaldehyde and urea in the presence of about .5–5 weight percent based on the weight of the phenol of an alkaline catalyst at a temperature of at least about 100 degrees centigrade for up to one hour of the total reaction time and adjusting the pH of the resulting product with an acid to provide a stable resin binder composition, said urea employed in a proportion to provide a total molar ratio of urea to formaldehyde of about 1:4 to about 1:8 in the resin binder composition, said phenol employed in a proportion to provide a total molar ratio of phenol to urea in the range of 1:0.5 to about 1:1.5 in the resin binder composition, which has a water tolerance of at least about 50 percent.

7. The resin binder composition produced by the process of claim 1.

8. The resin binder composition produced by the process of claim 2.

9. The rein binder composition produced by the process of claim 3.

10. The resin binder composition produced by the process of claim 4.

11. The resin binder composition produced by the process of claim 5.

12. The resin binder composition produced by the process of claim 6.

References Cited

UNITED STATES PATENTS

| | | | |
|---|---|---|---|
| 2,500,054 | 3/1950 | Anthony et al. | 260—840 |
| 3,168,490 | 2/1965 | Brown et al. | 260—29.4 |
| 3,335,113 | 8/1967 | Dundon | 260—69 |
| 3,306,864 | 2/1967 | Lang et al. | 260—17.2 |
| 3,404,198 | 10/1968 | Guyer | 260—840 |

OTHER REFERENCES

Chem. Abstr. 54: 11951c, "Coresand Binders," Brandeis.

Chem. Abst. 57: 10024i, Temkina.

Chem. Abst. 60: 14680c, "Urea-Form, Resins-Low Content Free HCHO," Tomas.

Chem. Abst. 57: 11012f, Gavat et al.

Chem. Abst. 63: 5532f, "Urea-Formaldehyde Solutions," Hewson.

WILLIAM H. SHORT, Primary Examiner

EDWARD WOODBERRY, Assistant Examiner

U.S. Cl. X.R.

260—17.2; 17.3, 29.4, 38, 39, 51.5, 838, 840

PO-1050
(5/69)

UNITED STATES PATENT OFFICE
CERTIFICATE OF CORRECTION

Patent No. 3,539,484      Dated November 10, 1970

Inventor(s) Richard C. Bowman, Edward J. Lang, and Frank S. Grazen

It is certified that error appears in the above-identified patent and that said Letters Patent are hereby corrected as shown below:

Column 2, line 52, for "110" read ---100---;

Column 3, line 42, delete "from";

Column 6, line 46, for "wherin" read ---wherein---; line 73, for "regrees" read ---degrees---;

Column 7, line 27, for "6" read ---60---;

Column 8, line 12, for "porperties" read ---properties---;

Column 12, line 26, for "rein" read ---resin---.

Signed and sealed this 23rd day of January 1973.

(SEAL)
Attest:

EDWARD M. FLETCHER, JR.
Attesting Officer

ROBERT GOTTSCHALK
Commissioner of Patent